Figure 1:
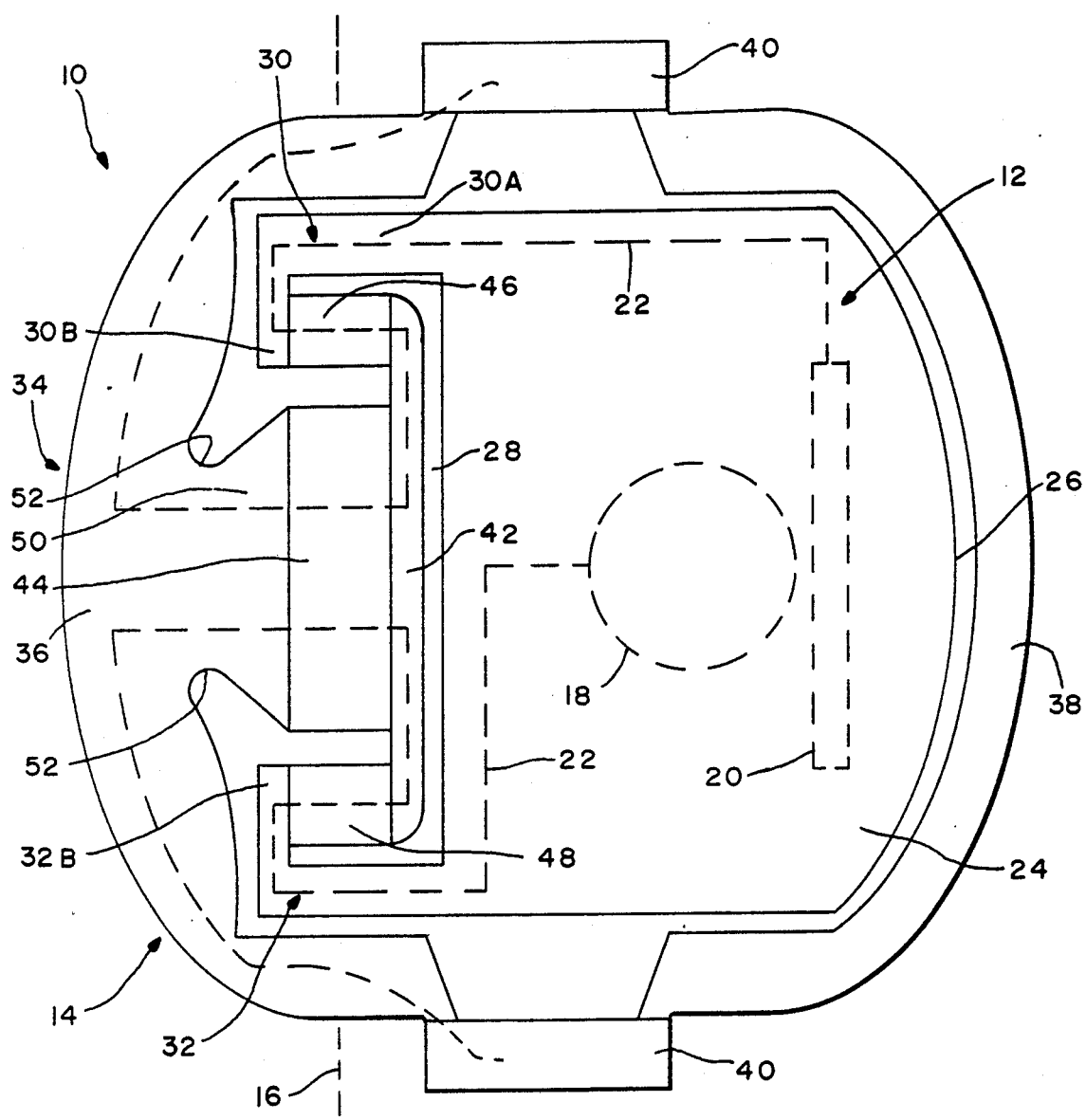

United States Patent [19]

Hanson

[11] Patent Number: 5,042,301
[45] Date of Patent: Aug. 27, 1991

[54] PENDULOUS ASSEMBLY FOR USE IN AN ACCELEROMETER

[76] Inventor: Richard A. Hanson, 21220 NE. 156th St., Woodinville, Wash. 98072

[21] Appl. No.: 480,274

[22] Filed: Feb. 15, 1990

Related U.S. Application Data

[60] Division of Ser. No. 221,116, Jul. 19, 1988, Pat. No. 4,955,233, which is a continuation-in-part of Ser. No. 899,975, Aug. 25, 1986, abandoned.

[51] Int. Cl.⁵ .............................................. G01P 15/08
[52] U.S. Cl. ...................................... 73/497; 73/517 B
[58] Field of Search ................ 73/497, 517 R, 517 B, 73/517 AV, 514

[56] References Cited

U.S. PATENT DOCUMENTS

| | | | |
|---|---|---|---|
| 4,071,838 | 1/1978 | Block | 73/517 R |
| 4,182,187 | 1/1980 | Hanson | 73/517 B |
| 4,779,463 | 10/1988 | Woodruff | 73/517 B |
| 4,926,689 | 5/1990 | Hanson | 73/517 B |
| 4,955,233 | 9/1990 | Hanson | 73/517 B |

FOREIGN PATENT DOCUMENTS 1534276 11/1978 United Kingdom ............. 338/5

*Primary Examiner*—John E. Chapman
*Attorney, Agent, or Firm*—Flehr, Hohbach, Test, Albritton & Herbert

[57] ABSTRACT

A pendulous assembly for use in an accelerometer or other such devices which senses forces acting on the device in a particular direction is disclosed herein. This assembly includes a proofmass and an arrangement supporting one end of the proofmass for pivotal movement back and forth about a given axis through a resting plane which entirely contains the proofmass when the latter is at rest. The support arrangement itself includes a frame, an isolation bridge or bridges and an arrangement of isolation bridge and proofmass flexures for supporting the isolation bridges between the proofmass and frame.

16 Claims, 3 Drawing Sheets

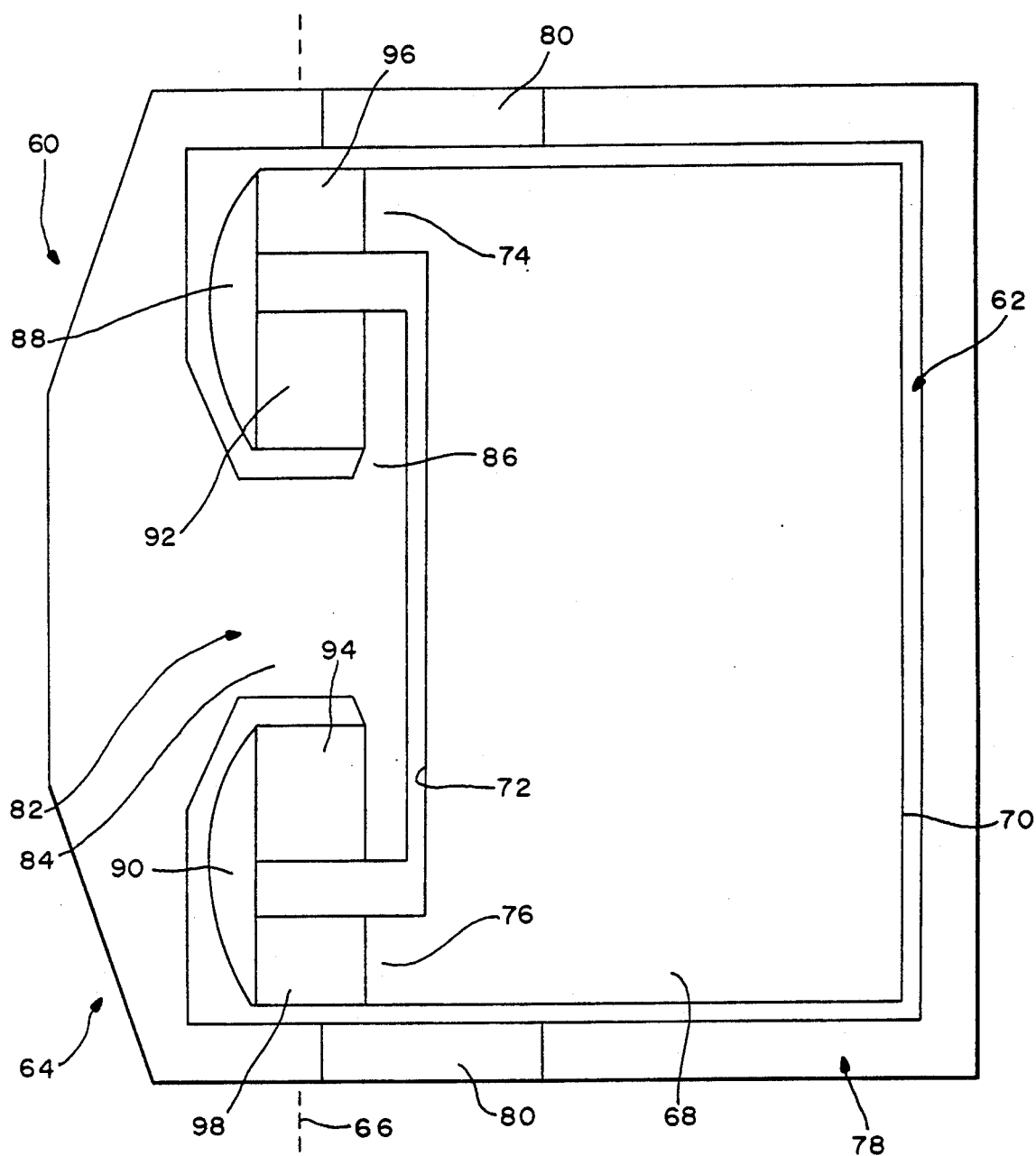
FIG.—3
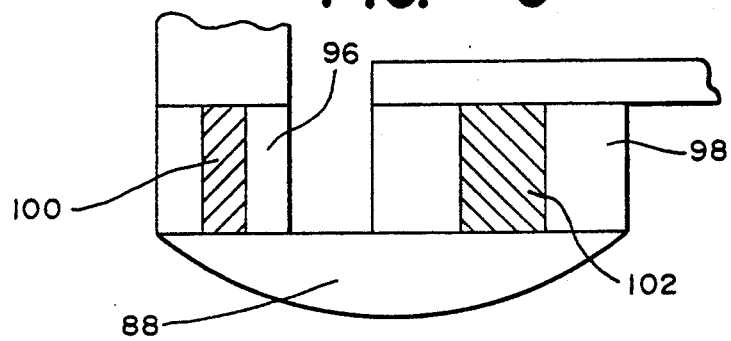
FIG.—4

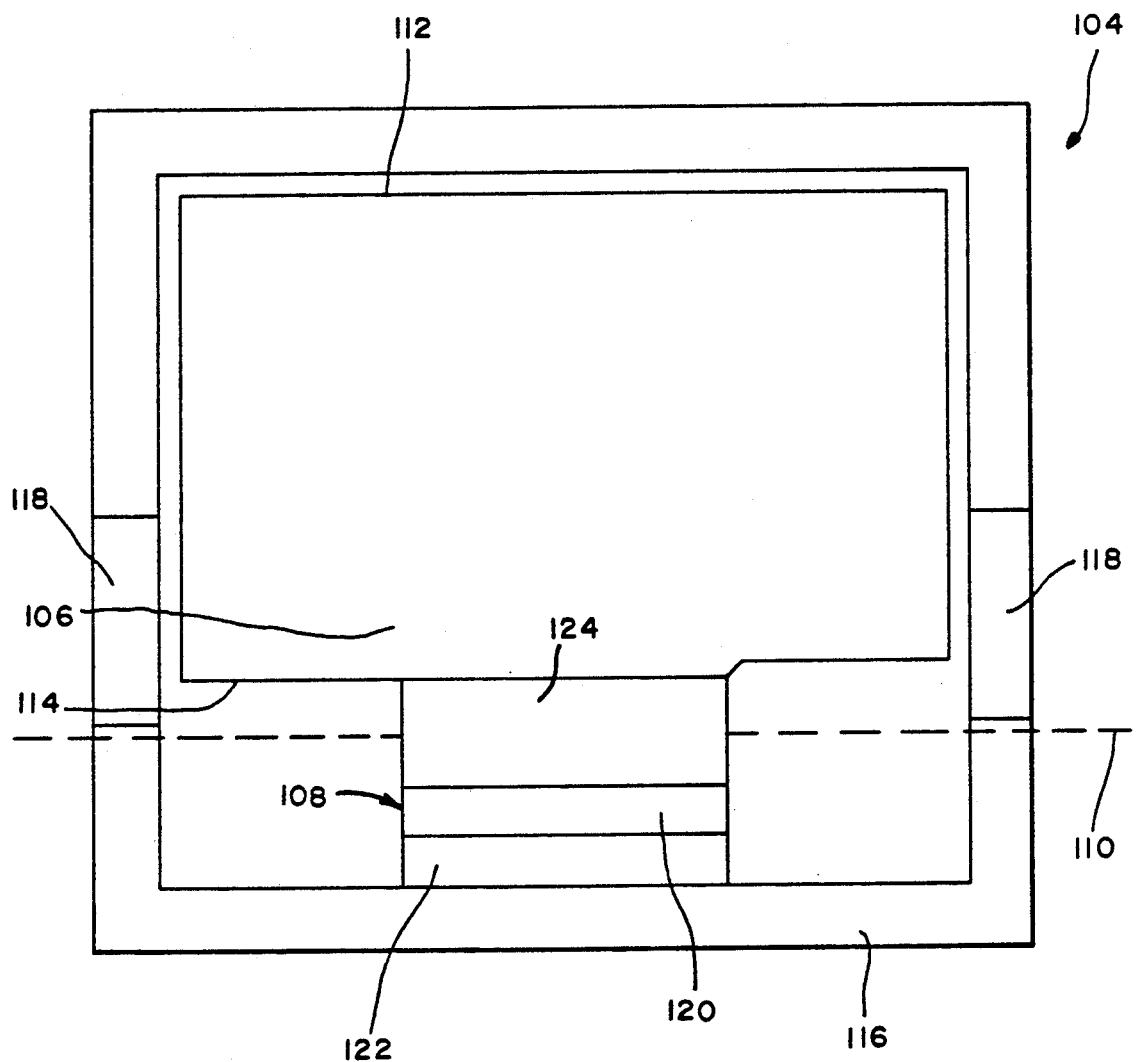
FIG.—5

PENDULOUS ASSEMBLY FOR USE IN AN ACCELEROMETER

This is a division of Ser. No. 07/221,116, filed July 19, 1988, now U.S. Pat. No. 4,955,233, which is a continuation-in-part of Ser. No. 06/899,975, filed Aug. 25, 1986, now abandoned.

This invention relates generally to a device such as an accelerometer for sensing forces acting on the device in a particular direction, and more particularly to the pendulous assembly for use in such a device.

In the above-recited co-pending application (hereinafter referred to as "Applicant's Parent Application"), there is disclosed (in FIG. 1) a typical prior art accelerometer which uses a pendulous assembly of the general type to which the present invention pertains. That accelerometer includes upper and lower magnetic structures having pickoff plates and a pendulous type of proofmass assembly therebetween. The proofmass assembly is comprised of a support frame including mounting pads, a reed or pendulum connected to the frame by means of a pair of flexure hinges, and a pickoff plate and torque coil mounted on both the top and bottom surfaces of the proofmass. The overall device senses acceleration along an axis normal to the proofmass.

As described in Applicant's Parent Application, any acceleration having a component along the accelerometer's sensitive axis (which is normal to the plane of the frame and its proofmass) will cause the proofmass to tend to angularly deflect on its flexures, either up or down with respect to the frame depending on the direction of acceleration. Deflection of the proofmass causes cooperating pickoff plates on the proofmass and on the magnetic structures to apply a signal to sensing electronics which, in turn, apply restoring current to the torque coils to return the proofmass to its undeflected (resting) position. The amount of such restoring current provides a measure of the sensed acceleration, after calibration of the accelerometer and its associated sensing electronics.

It should be appreciated that the device just described is extremely sensitive to any type of movement of its proofmass. Even random micromovement that cannot be compensated for may adversely affect the accuracy of the device. Such movement typically results from internal stresses within the proofmass assembly and stresses imparted to the assembly from the outside world through mounting pads which form part of the assembly frame. A source of internal stress may be metallized electrically conductive leads between the pickoff plates or torque coils on the proofmass or static electricity dissipation element plates on the proofmass and the outside world. Typically, these electrically conductive leads are made of different material than the proofmass, frame and flexures and display a different thermal coefficient of expansion. This results in what may be referred to as localized bimetal stresses.

It is virtually impossible to eliminate all of the different types of unwanted stresses from the frame forming part of the proofmass assembly. However, at the same time, such stresses will not adversely affect the operation of the overall device so long as those stresses do not reach the proofmass itself. Applicant's Parent Application, recited above, discloses different proofmass assemblies which deal with those unwanted stresses and strains. In particular embodiments (FIGS. 8 and 10) in that application, an isolation bridge is supported by an arrangement of flexures between the assembly frame and the proofmass in order to isolate the proofmass from the frame. As will be seen hereinafter, the present application contemplates three additional embodiments.

In view of the foregoing, it is a general object of this invention to provide a pendulous type of proofmass assembly for use in an accelerometer or other such device which senses forces in a particular direction, and specifically a proofmass assembly which isolates its proofmass from stresses occurring in its frame.

Another general object of this invention is to provide a pendulous type of proofmass assembly which includes an arrangement of flexures connected to and supporting its proofmass for pivotal or deflecting movement and which also isolates the proofmass supporting flexures from stresses in its frame.

A more particular object herein is to provide a pendulous type of proofmass assembly of the last-mentioned type, and specifically an assembly which is designed to cancel out bimetal stresses occurring at the flexures.

Another object herein is to provide a proofmass assembly which is designed to display a high resonant frequency, the low angular spring rate, and low loading stresses along the pivot axis of its proofmass.

Still another particular object of this invention is to provide a pendulous type of proofmass assembly that supports its proofmass by means of a frame and an arrangement of flexures including flexures connected directly to the frame which is specifically configured to reduce the amount of stress that reaches any of the flexures from the frame.

As will be described in more detail hereinafter, the pendulous type of proofmass assembly disclosed herein comprises a proofmass and means supporting one end of the proofmass for pivotal movement back and forth about a deflecting axis through a resting place which entirely contains the proofmass when the latter is at rest. The supporting means includes (1) a frame and means for mounting the frame to a main support forming part of a force sensing device containing the assembly, (2) isolation bridge means, (3) isolation bridge flexure means connecting the isolation bridge means with a section of the frame for pivotal movement of the isolation bridge means back and forth about the deflecting axis, and (4) proofmass flexure means separate from and substantially unconnected, preferably entirely so, with the isolation bridge flexure means. The proofmass flexure means connects the proofmass with the isolation bridge means for pivotal movement of the proofmass back and forth about the deflecting axis.

As will be seen, the isolation bridge means serves to isolate the proofmass and proofmass flexure means from stresses and strains in the frame and isolation bridge flexure means. In two particular embodiments, all of the flexure means and the isolation bridge means are configured such that one entire side of the isolation bridge means is free-floating. At the same time, electrically conductive leads are arranged on the isolation bridge flexure means and the proofmass flexure means supporting the free-floating isolation bridge means to achieve bimetal stress cancellation. As will also be seen, in one of these two latter embodiments, the proofmass and proofmass supporting means are specifically configured so that the free-floating isolation bridge means is located between all of the flexure means and a main part of the proofmass such that the overall assembly can operate at a very high resonant frequency and a low angular spring rate and with low loading stress along its pivot axis.

Figure 2:
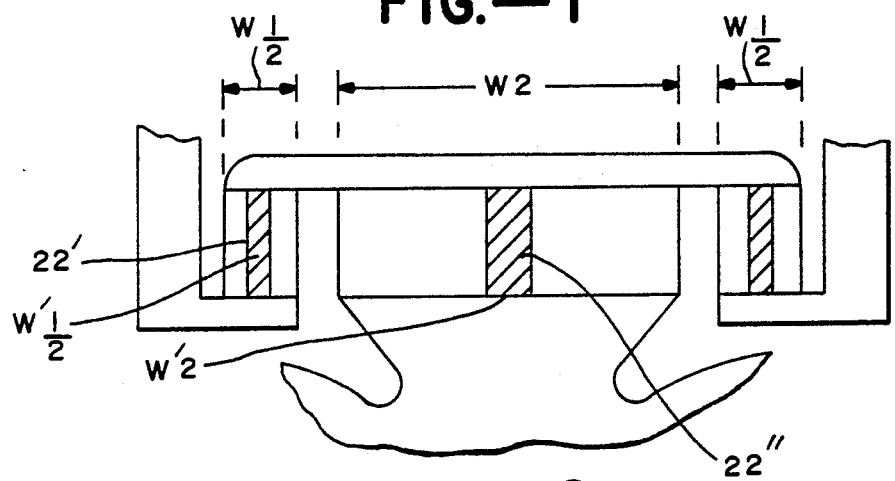

The various embodiments of this invention, including other features, will be described in more detail hereinafter in conjunction with the drawings, wherein:

FIG. 1 diagrammatically illustrates, in plan view, a pendulous type of proofmass assembly designed in accordance with one embodiment of this invention;

FIG. 2 diagrammatically shows a section of the assembly of FIG. 1, specifically illustrating a particular operating feature of the assembly;

FIG. 3 diagrammatically illustrates, in plan view, a pendulous type of proofmass assembly designed in accordance with the second embodiment of this invention;

FIG. 4 diagrammatically shows a section of the assembly of FIG. 3, specifically illustrating the particular operating feature of the assembly; and FIG. 5 diagrammatically illustrates, in plan view, a pendulous type of proofmass assembly designed in accordance with a third embodiment of this invention.

Turning to the drawings, attention is first directed to FIG. 1 which, as stated above, diagrammatically illustrates a pendulous type of proofmass assembly designed in accordance with one embodiment of this invention. This assembly is generally indicated by the reference number 10 and, while not shown, forms part of an overall accelerometer or other such device which senses forces acting on the device in a particular direction. For a more detailed discussion of the other components making up such a device, references is made to applicant's Parent Application recited above.

Proofmass assembly 10 is shown including a proofmass 12 and an overall arrangement 14 supporting the proofmass for pivotal movement back and forth about a given deflecting axis 16 through a resting plane in the plane of the paper which contains the proofmass when the latter is at rest, that is, in the absence of any sensing forces. Proof mass 12 is shown supporting a torque coil and pickoff plate, as indicated by the dotted lines at 18 and 20, respectively. These components and similar ones on the opposite side of the proofmass are connected to the outside world by means of electrically conductive leads generally indicated by dotted lines at 22. These leads are typically made of chrome/gold having a coefficient of thermal expansion not matching the coefficient of thermal expanion of the flexure material.

It is to be understood that torque coils 18 and pickoff plates 20 are not pertinent to this invention other than as a part of the overall accelerometer or like device and hence, will not be described further herein. This is also true for any and all of the other components not shown, but which form part of the overall device. For example an alternative to the torque coils, pick off plates and associates components could be a force sensitive vibrating crystal. This invention is directed to the specific way in which proofmass 12 is supported by arrangement 14 and, in particular, the way in which it is isolated from stresses in the support arrangement and the outside world generally.

Still referring to FIG. 1, proofmass 12 is shown including a flat, generally rectangular main body 24 having a front elongated edge 26 and a generally parallel back edge 28. Proof mass 12 also includes a pair of generally L-shaped legs 30 and 32 integrally formed with and extending rearwardly from opposite ends of back edge 28. These legs include corresponding sections 30A–30B and 32A–32B, respectively. Note that sections 30A and 32A are normal to edge 28 of main body 24 and sections 30B and 32B are parallel with edge 28 and extend toward one another.

Support arrangement 14 includes an overall flat support frame 34 which circumscribes proofmass 12. The support frame includes opposing sections 36 and 38, connected together by mounting pads 40 which serve to mount the frame to a main support (not shown) forming part of the overall accelerometer or other such device. Support arrangement 14 also includes a flat, elongated isolation bridge 42, an isolation bridge flexure 44 connecting the isolation bridge with a segment of frame 34 for pivotal movement of the isolation bridge back and forth about axis 16, and a pair of proofmass flexures 46 and 48 connecting proofmass 12 with isolation bridge 42 for pivotal movement of the proofmass back and forth about axis 16. In a preferred embodiment of this invention, the entire proofmass 12 and the entire support arrangement 14 including frame 34, all the flexures and the isolation bridge are constructed as an integrally formed sheet or wafer of material, specifically from a single fused quartz wafer having a thermal coefficient of expansion of near zero. As in the embodiments described in applicant's Parent Application, portions of this integral wafer corresponding to the flexures are etched so as to be thinner and therefore more flexible than the proof-mass, frame and isolation bridge. At the same time, the mounting pads 40 may be designed so that they are thicker than the rest of the frame. While this is a preferred embodiment, it is to be understood that this invention is not limited to this integral approach or to the use of quartz material.

As can be seen in FIG. 1, flexures 44, 46 and 48 are lined up adjacent to one another along axis 16. Flexure 44 supports isolation bridge 42 to frame 34 for pivotal movement about axis 16 while flexures 46 and 48 support proofmass 12 to the isolation bridge for pivotal movement about the same axis. In the absence of any forces, for example, acceleration forces, normal to main body 24 of proofmass 12, the proofmass remains at rest in the same plane as frame 34, isolation bridge 42, and flexures 44, 46 and 48, all within the plane of the paper.

On the other hand, in the presence of forces normal to the resting plane containing these components, main body 24 of proofmass 12 deflects about axis 16, either upward or downward depending upon the direction of the force. It is this movement that is restrained by the torque coils 18, pickoff plates 20 and the associated electronics for measuring the forces that are present at any given moment.

As discussed in applicant's Parent Application, a proofmass assembly that supports a proofmass to a frame for pivotal movement about a given axis by means of flexures is not new. Such an arrangement is generally illustrated in FIG. 1 in the parent application. However, the particular support arrangement 14 forming part of overall proofmass assembly 10 shown here includes a number of features which have been designed in accordance with the present invention to improve the typical arrangement in the prior art. These various features will be discussed below, one at a time. For the moment, it suffices to say that all of the features of support arrangement 14 rely on the use of isolation bridge 42 and its associated isolation bridge flexure 44 which do not form part of the typical prior art approach.

It is important to note that while both the isolation bridge flexure 44 and the proofmass flexures 46, 48 are connected to isolation bridge 42, they remain separate from and entirely unconnected with one another. At the same time, the isolation bridge 42 is relatively rigid. Any stresses that appear in frame 36 must pass through isolation bridge flexure 44 and the isolation bridge 42 before they can ever reach proofmass flexures 46, 48 and certainly before they ever reach proofmass 12. Because of the rigidity of the isolation bridge and the flexibility of the isolation bridge flexure, most stresses that do travel toward the proofmass from the frame are substantially attenuated, if not entirely eliminated, by the isolation bridge flexure and isolation bridge before ever reaching the proofmass flexures. Thus, the isolation bridge and its associated isolation bridge flexure serve as a means of isolating the proofmass from the stresses in the frame. This is not only true of assembly 10 but the other two assemblies to be described hereinafter. It is also true for the proofmass assemblies illustrated in FIGS. 8 and 10 of applicant's Parent Application.

A specific feature of support arrangement 14 over and above the fact that it uses an isolation bridge generally is that the isolation bridge is connected to the isolation bridge flexure 44 and proofmass flexures 46, 48 on the same longitudinal side. The opposite longitudinal side of the isolation bridge is not connected to any flexures or other components, that is, it is free-floating. This is a first step in the design of support arrangement 14 to achieve bimetal stress cancellation of the flexures due to electrically conductive leads 22 which, in a preferred embodiment, have a different coefficient of thermal expansion, as noted heretofore. As a second step in this design, all of the flexures 44, 46 and 48 in the preferred embodiment are of substantially the same length and vary in width in accordance with a certain ratio. As illustrated in FIG. 2, the combined width of the proofmass flexures 46, 48 is $W_1$ while the width of isolation bridge flexure 44 is $W_2$. Thus, the ratio $W_1/W_2$ equals a specific ratio R. The third design criteria to achieve bimetal stress cancellation is that electrically conductive leads 22 extending across the flexures do so across the lengths of the flexures parallel to one another so that the ratio of their widths also equals the same ratio R. As shown in FIG. 2, the combined sections 22' of lead 22 extending across each proofmass flexure have a combined width $W1'$ and the section 22'' of lead 22 extending across the isolation bridge flexure has a width $W2'$. Thus, $W1'$ and $W2'$ are provided so that the ratio $W1'/W2'$ also equals R.

This discussion immediately above has assumed that the two flexures 46 and 48 are of the same width $W\frac{1}{2}$ resulting in a combined $W_1$. It could be that the two flexures differ in width (resulting in the same combined $W_1$). In this case, the width of the leads 22' would vary in the same way. In order to achieve complete bimetal stress cancellation, in addition to the requirements just recited, all of the flexures must be of equal thickness and free of stress from the frame or, for that matter, from the proofmass itself. Under this ideal situation, all the stresses resulting from the differences in the coefficients of thermal expansion between leads 22 and the flexures will cancel each other out in the isolation bridge by causing the free-floating edge of the bridge to flex sufficiently to eliminate those stresses. This is what is meant by bimetal stress cancellation.

As indicated above, bimetal stress cancellation presupposes that there are no other stresses in the isolation bridge and proofmass flexures. If there are, such stresses tend to interfere with the ability of the flexures and isolation bridge to achieve total bimetal stress cancellation. As a result, it is important to isolate the flexures from random stresses. In the case of isolation bridge flexure 44, while it cannot be completely isolated from stresses in frame 34, frame section 36 is configured to reduce the stresses introduced into the frame at mounting pads 40. Note specifically that flexure 44 is connected directly to segment 50 of frame section 36. Segment 50 decreases in width significantly as a result of cutouts 52 between the isolation bridge flexure and mounting pads 40. By providing the cutouts, the travel distance between the mounting pads and flexure 44 along frame section 36 is greater than it would be in the absence of cutouts 52 and, hence, this greater distance aids to further attenuate those stresses before the reach flexure 44. In the case of proofmass flexures 46 and 48, any unwanted stresses in the main body 24 of proofmass 12 must travel along legs 30 and 32 before they reach those flexures. Therefore, the stresses travel a greater distance to reach the flexures than they would if the flexures were connected directly to edge 28 and, therefore, legs 30 and 32 aid in attenuating the stresses before they reach the flexures.

Still referring to FIG. 1, it is important to note that isolation bridge 42 is located between the main body 24 of the proofmass 12 and all of the flexures 44, 46, 48. Legs 30 and 32 of the proofmass are especially designed to make this possible. This particular "inside-out" configuration is to be distinguished from the proofmass assembly illustrated in FIG. 10 in applicant's Parent Application. In that assembly, the isolation bridge flexures and the proofmass flexures are disposed between the proofmass and isolation bridge.

The inside-out configuration of support arrangement 14 illustrated in FIG. 1 has a number of advantages. It allows the overall assembly to operate at a relatively high resonant frequency, for example, above 2000 Hz, and at a relatively low angular spring rate. It also results in relatively low stresses for loading along the pivot axis 16. As stated above, in a preferred embodiment, the proofmass, frame, flexures and the isolation bridge are constructed of a single quartz wafer, which is a very high Q material, that is, a material that displays very low energy losses. Therefore, it is important that this integral arrangement of components does not reach its resonant frequency which would cause it to vibrate out of control. Hence, it is important that the overall arrangement be designed to display a high resonant frequency. At the same time, the proofmass assembly is intended, for example, for use in an accelerometer which is a closed loop device. Therefore, any electronic errors are magnified and the higher the spring rate, the larger these errors become. A similar error will occur if the proofmass assembly is used with force sensitive vibrating crystals. Hence, it is important to keep the assembly's angular spring rate relatively low. Also, stresses along the loading axis affect the cross coupling sensitvity of the device and, hence, loading stresses should also be kept low. As indicated above, the inside-out configuration of support arrangement 14 makes it possible to achieve all of these objectives.

Turning to FIGS. 3 and 4, attention is directed to a pendulous type of proofmass assembly designed in accordance with a second embodiment of this invention. This proofmass assembly is generally designated by the reference number 60 and includes a generally rectangular proofmass 62 and an arrangement 64 supporting the proofmass for pivotal movement back and forth about a given axis 66 through a resting plane (the plane of the paper) which entirely contains the proofmass when the latter is at rest. Proof mass assembly 60 functions in the same manner as previously described assembly 10. Hence, reference is made thereto. In addition, like proofmass assembly 10, assembly 60 may include, for example, torque coils and pickoff plates on opposite sides of proofmass 62 and electrically conductive leads extending from the torque coils and pickoff plates to the outside world. In FIG. 3, proofmass 62 is shown including a generally rectangular main body 68 having a front longitudinal edge 70 and a back longitudinal edge 72. A pair of legs 74, 76 extend rearwardly from opposite ends of edge 72.

Support arrangement 64, like the previously described support arrangement 14, includes a frame 78 which circumscribes the proofmass and which includes its own mounting pads 80. The frame also includes a generally T-shaped section 82 defined by a stem 84 and crossbar 86. The support arrangement also includes two isolation bridges 88, 90, two isolation bridge flexures 92, 94, and two proofmass flexures 96, 98. Isolation bridge flexure 92 and proofmass flexure 96 connect opposite ends of the same side of isolation bridge 88 to frame 78 and proofmass 62, respectively. At the same time, isolation bridge flexure 94 and proofmass flexure 98 connect opposite ends of the same side of isolation bridge 90 to frame 78 and proofmass 62, respectively.

Note from FIG. 3 that the four flexures 92, 94, 96, 98 are all in line with one another along axis 66. These flexures function in the same manner as the previously described flexures to support proofmass 62 for pivotal movement back and forth about axis 66. In this regard, like assembly 10, the proofmass, frame, isolation bridges and flexures all lie within the resting plane of the assembly in the absence of any sensing forces. In a preferred embodiment, all of these components are preferably formed as an integral quartz wafer with the flexures etched so that they are thinner than the rest of the components and thereby function in the intended manner.

It should be apparent that each of the isolation bridges 88 and 90 is free-floating along its longitudinal edge opposite its associated flexures. At the same time, the isolation bridge flexure and proofmass flexures supporting each isolation bridge are of substantially the same length. Thus, as in assembly 10, the electrically conductive leads crossing these flexures can be designed to provide bimetal stress cancellation. In FIG. 4, the isolation bridge 88 and its associated flexures 92, 96 are shown with cooperating electrically conductive lead segments 100 and 102. Note that isolation bridge flexure 98 is twice as wide as proofmass flexure 96. As a result, lead section 102 is made twice as wide as lead section 100.

As stated in conjunction with assembly 10, in order for bimetal cancellation to be successful, in-plane stress in the flexures should be kept to a minimum. In assembly 60, note that any stress in the frame originating at the mounting pads must travel through T-shaped section 82 including specifically, crossbar 86 before they ever reach flexures 92 and 94. This T-shaped section helps to attenuate such stresses. At the same time, legs 74 and 76 forming part of overall proofmass 62 help attenuate stresses in the proofmass before they reach flexures 96 and 98. This aids in assuring that bimetal stress cancellation is successful. In addition, two bridges rather than one, improves bimetal cancellation because the equality of flexure geometry applied only to each isolation and proofmass flexure set separately and each pair is more isolatd from frame stress than in the first embodiment.

Turning to FIG. 5, attention is directed to a pendulous type proofmass assembly designed in accordance with still another embodiment of this invention. This proofmass assembly, which is generally designated by the reference number 104, includes a generally rectangular proofmass 106 and an arrangement 108 for supporting the proofmass for pivotal movement back and forth about an axis 110. Proof mass assembly 104 operates in a manner similar to assemblies 10 and 60 and hence, its operation will not be described herein.

Proofmass 106 is generally rectangular in configuration and includes a front edge 112 and a back edge 114. Unlike previously described proof masses 24 and 26, proofmass 112 does not include any leg sections.

Support arrangement 108 includes a frame 116 which circumscribes proofmass 106 and which includes its own mounting pads 118. Arrangement 108 also includes a single isolation bridge 120, a single isolation bridge flexure 122 and a single proofmass flexure 124. The isolation bridge flexure connects one side of the isolation bridge to frame 116 and the proofmass flexure 124 connects the opposite side of the isolation bridge to proofmass 114. Like in the previous embodiments, the proofmass, frame, isolation bridge and flexures are preferably integrally formed as a single flat wafer of quartz with the flexures being etched thinner than the other components to function in the intended manner.

It should be noted that isolation bridge 120, like the isolation bridge in FIG. 8 of applicant's Parent Application, is not free-floating. As a result, this particular configuration will not sustain bimetal cancellation. As a result, this particular configuration is contemplated for use in proofmass assemblies that do not require electrically conductive leads, that is, proofmass assemblies that use crystals to restrain their proofmass and where no static electrical discharge traces across the flexures are required. With particular regard to this latter point, while assemblies 10 and 60 are more suitable for use with electronic restraining means, for example, torque coils and pickoff plates and associated electronics, it is to be understood that they could also use quartz crystals for restraining purposes.

What is claimed:

1. A pendulous assembly for use in an accelerometer or other such device which senses forces acting on the device in a particular direction, said assembly comprising:
   (a) a proofmass; and
   (b) means supporting one end of said proofmass for pivotal movement about a given axis back and forth through a resting plane which contains said proofmass when the proofmass is at rest in the absence of any of said forces, said supporting means including
      (i) a frame and means for mounting the frame to a main support forming part of the force sensing device,
      (ii) an isolation bridge;
      (iii) isolation bridge flexure means connecting said isolation bridge with a section of said frame for pivotal movement of said isolation bridge back and forth about said given axis; and (iv) proofmass flexure means separate from and substantially unconnected with said isolation bridge flexure means, said proofmass flexure means comprising a pair of proofmass flexures connecting said proofmass with said isolation bridge for pivotal movement of said proofmass back and forth about said given axis;

(v) said isolation bridge flexure means and said proofmass flexure means being aligned along said given axis with said isolation bridge flexure means positioned between said proofmass flexures.

2. A pendulous assembly for use in an accelerometer or other such device which senses forces acting on the device in a particular direction, said assembly comprising:

(a) a proofmass; and
(b) means supporting one end of said proofmass for pivotal movement about a given axis back and forth through a resting plane which contains said proofmass when the proofmass is at rest in the absence of any of said forces, said supporting means including
 (i) a frame and means for mounting the frame to a main support forming part of the force sensing device,
 (ii) an isolation bridge;
 (iii) isolation bridge flexure means connecting said isolation bridge with a section of said frame for pivotal movement of said isolation bridge back and forth about said given axis; and
 (iv) proofmass flexure means separate from and substantially unconnected with said isolation bridge flexure means, said proofmass flexure means connecting said proofmass with said isolation bridge for pivotal movement of said proofmass back and forth about said given axis;
(c) said proofmass including a main body and proofmass means connecting said main body with said proofmass flexure means such that the main body of said proofmass is located on the opposite side of said isolation bridge as said isolation bridge flexure means and said proofmass flexure means.

3. An assembly according to claim 2 wherein
(a) said isolation bridge is elongated,
(b) said proofmass flexure means includes two proofmass flexures connected to opposite ends of said isolation bridge, and
(c) said means connecting said main body with said proofmass flexure means includes two leg-like sections of said proofmass on opposite sides of the main body of said proofmass.

4. An assembly according to claim 3 wherein said isolation bridge flexure means includes a single isolation bridge flexure connected to said isolation bridge between said proofmass flexures.

5. An assembly according to claim 4 wherein said frame section connected to said isolation bridge by said isolation bridge flexure extends between said frame mounting means and includes a segment thereof which is adjacent to and joins the isolation bridge flexure and which is narrower in width than said isolation bridge flexure.

6. An assembly according to claim 5 including electrically conductive leads located on end extending between said proofmass and said frame across said flexures and said isolation bridge for carrying electrical signals from certain components on said proofmass to cooperating components external of the proofmass assembly, said leads displaying a thermal coefficient of expansion different from that of said flexures.

7. An assembly according to claim 6 wherein said isolation bridge flexure and said proofmass flexures extend parallel with one another and are of substantially equal length, wherein the combined width of said proofmass flexures and the width of said isolation bridge flexure display a specific ratio, wherein the conductive leads on said flexures extend across the flexures in straight lines parallel with the flexures, and wherein the combined width of the leads across said proofmass flexure and the width of the lead across said isolation bridge flexure display said specific ration.

8. An assembly according to claim 7 wherein said flexures are planar in configuration and extend entirely in said resting plane when said proofmass is at rest.

9. A pendulous assembly for use in an accelerometer or other such device which senses forces acting on the device in a particular direction, said assembly comprising:

(a) a proofmass; and
(b) means supporting one end of said proofmass for pivotal movement about a given axis back and forth through a resting plane which contains said proofmass when the proofmass is at rest in the absence of any of said forces, said supporting means including
 (i) a frame and means for mounting the frame to a main support forming part of the force sensing device,
 (ii) an isolation bridge;
 (iii) isolation bridge flexure means connecting said isolation bridge with a section of said frame for pivotal movement of said isolation bridge back and forth about said given axis; and
 (iv) proofmass flexure means connecting said proofmass with said isolation bridge for pivotal movement of said proofmass back and forth about said given axis;
(c) said proofmass including a main body and means connecting said main body with said proofmass flexure means such that the main body of said proofmass is located on the opposite side of said isolation bridge as said isolation bridge flexure means and said proofmass flexure means.

10. A pendulous assembly for use in an accelerometer or other such device including an arrangement for sensing forces acting on the device in a particular direction, said assembly comprising:

(a) a proofmass;
(b) means forming part of said sensing arrangement and carried by or in direct engagement with said proofmass for specifically sensing said forces acting on said proofmass; and
(c) means supporting one end of said proofmass for pivotal movement about a given axis back and forth through a resting plane which contains said proofmass when the proofmass is at rest in the absence of any of said forces, said supporting means including
 (i) an isolation bridge support and means for mounting the isolation bridge support to a main support forming part of the force sensing device,
 (ii) at least one isolation bridge;
 (iii) isolation bridge flexure means connecting said isolation bridge with a section of said isolation bridge support for pivotal movement back and forth about said given axis; and (iv) proofmass flexure means connecting said proofmass with said isolation bridge for pivotal movement of said proofmass back and forth about said given axis;

(d) said proofmass including a main body and means connecting said main body with said proofmass flexure means such that the main body of said proofmass is located on the opposite side of said at least one isolation bridge as said isolation bridge flexure means and said proofmass flexure means.

11. An assembly according to claim 10 wherein (a) said at least one isolation bridge includes a single, elongated isolation bridge, (b) said proofmass flexure means includes two proofmass flexures connected to opposite ends of said isolation bridge, and (c) said means connecting said main body with said proofmass flexure means includes two leg-like sections of said proofmass on opposite sides of the main body of said proofmass.

12. An assembly according to claim 11 wherein said isolation bridge flexure means includes a single isolation bridge flexure connected to said isolation bridge between said proofmass flexures.

13. An assembly according to claim 12 wherein said section of said isolation bridge support connected to said isolation bridge by said isolation bridge flexure extends between said mounting means and includes a segment thereof which is adjacent to and joins the isolation bridge flexure and which is narrower in width than said isolation bridge flexure.

14. An assembly according to claim 13 including electrically conductive leads located on and extending between said proofmass and said frame across said flexures and said isolation bridge for carrying electrical signals from certain components on said proofmass to cooperating components external of the proofmass assembly, said leads displaying a thermal coefficient of expansion different from that of said flexure.

15. An assembly according to claim 14 wherein said isolation bridge flexure and said proofmass flexures extend parallel with one another and are of substantially equal length, wherein the combined width of said proofmass flexures and the width of said isolation bridge flexures display a specific ratio, wherein the conductive leads on said flexures extend across the flexures, and wherein the combined width of the leads across said proofmass flexure and the width of the lead across said isolation bridge flexure display said specific ratio.

16. An assembly according to claim 15 wherein said flexures are planar in configuration and extend entirely in said resting plane when said proofmass is at rest.

* * * * *